United States Patent
Wu

(10) Patent No.: US 9,434,128 B2
(45) Date of Patent: Sep. 6, 2016

(54) NON-WOVEN ELASTIC CLOTH HAVING WOVEN-LIKE TEXTURE

(71) Applicant: Wen-Huei Wu, Taipei (TW)

(72) Inventor: Wen-Huei Wu, Taipei (TW)

( * ) Notice: Subject to any disclaimer, the term of this patent is extended or adjusted under 35 U.S.C. 154(b) by 252 days.

(21) Appl. No.: 14/043,162

(22) Filed: Oct. 1, 2013

(65) Prior Publication Data
US 2014/0093680 A1 Apr. 3, 2014

(30) Foreign Application Priority Data

Oct. 2, 2012 (TW) .............................. 101136362 A

(51) Int. Cl.
| | |
|---|---|
| *B32B 3/24* | (2006.01) |
| *B32B 3/26* | (2006.01) |
| *B32B 5/02* | (2006.01) |
| *B32B 27/12* | (2006.01) |
| *B32B 27/30* | (2006.01) |
| *B32B 27/32* | (2006.01) |
| *B32B 27/40* | (2006.01) |
| *B32B 3/12* | (2006.01) |
| *B32B 3/28* | (2006.01) |

(52) U.S. Cl.
CPC .................. *B32B 3/263* (2013.01); *B32B 3/12* (2013.01); *B32B 3/266* (2013.01); *B32B 3/28* (2013.01); *B32B 5/022* (2013.01); *B32B 5/028* (2013.01); *B32B 27/12* (2013.01); *B32B 27/306* (2013.01); *B32B 27/32* (2013.01); *B32B 27/40* (2013.01); *B32B 2274/00* (2013.01); *B32B 2307/51* (2013.01); *Y10T 428/24331* (2015.01)

(58) Field of Classification Search
CPC ...................................................... B32B 3/266
See application file for complete search history.

(56) References Cited

U.S. PATENT DOCUMENTS 4,640,529 A * 2/1987 Katz ........................ D05C 1/08
112/439

* cited by examiner

Primary Examiner — William P Watkins, III
(74) Attorney, Agent, or Firm — Faegre Baker Daniels LLP

(57) ABSTRACT

A non-woven elastic cloth includes a perforated elastomer film having discrete warp lines, discrete weft lines, and peripheral flanges. Each of the discrete warp lines has warp segments. Each of the discrete weft lines has weft segments. The warp segments intersect the weft segments so as to form a woven-like texture and define grid spaces thereamong. Each warp segment has two opposite ends cooperating with two adjacent ones of the weft segments to form two first V-shaped recesses. Each weft segment has two opposite ends cooperating with two adjacent ones of the warp segments to form two second V-shaped recesses. Each peripheral flange protrudes outwardly of a respective grid space.

12 Claims, 6 Drawing Sheets

NON-WOVEN ELASTIC CLOTH HAVING WOVEN-LIKE TEXTURE

CROSS-REFERENCE TO RELATED APPLICATION

This application claims priority of Taiwanese application no. 101136362, filed Oct. 2, 2012, the entire disclosure of which is hereby expressly incorporated herein by reference.

BACKGROUND OF THE INVENTION

1. Field of the Invention

This invention relates to a non-woven elastic cloth having a woven-like texture, more particularly to a non-woven elastic cloth including a perforated elastomer film having discrete warp lines and discrete weft lines.

2. Description of the Related Art

Woven fabrics tend to be stable and more rigid than knitted fabrics. Knitted fabrics are flexible and stretchable in both vertical and horizontal directions even if non-elastic yarns are used. It is known in the art that woven fabrics can include elastic yarns to increase elasticity of the woven fabrics.

U.S. Patent Application Publication No. 2011/0212659 discloses a method of making a woven fabric that includes hard warp yarns, hard weft yarns which are interlaced with the hard warp yarns, and elastomeric weft yarns which are interlaced with the hard warp yarns. The elastomeric weft yarns have a greater shrinkage ratio than that of the hard warp yarns and the hard weft yarns.

However, the manufacturing costs of making the woven fabric are expensive. In addition, the woven fabric thus formed tends to form wrinkles after being stretched, and requires a relatively long time to restore to its original shape after being deformed. Moreover, the woven fabric thus formed still has a relatively low elasticity.

SUMMARY OF THE INVENTION

Therefore, an object of the present invention is to provide a non-woven elastic cloth having a woven-like texture that can overcome the aforesaid drawbacks associated with the prior art.

According to this invention, there is provided a non-woven elastic cloth having a woven-like texture that simulates a texture of interlaced warp and weft yarns of a conventional woven cloth. The non-woven elastic cloth comprises a perforated elastomer film having a plurality of discrete warp lines extending in a warp direction and adapted to simulate the warp yarns of the conventional woven cloth, a plurality of discrete weft lines extending in a weft direction and adapted to simulate the weft yarns of the conventional woven cloth, and a plurality of peripheral flanges. Each of the discrete warp lines has a plurality of warp segments. Each of the discrete weft lines has a plurality of weft segments. The warp segments of the warp lines intersect the weft segments of the weft lines so as to form a woven-like texture and to define a plurality of grid spaces thereamong. Each of the warp segments has two opposite ends that respectively meet and cooperate with two adjacent ones of the weft segments to form two first V-shaped recesses thereat. Each of the weft segments has two opposite ends that respectively meet and cooperate with two adjacent ones of the warp segments to form two second V-shaped recesses thereat. Each of the peripheral flanges protrudes outwardly of a respective one of the grid spaces from corresponding ones of the warp and weft segments that cooperatively define the respective one of the grid spaces, and has an end opening that is disposed outwardly of the respective one of the grid spaces.

BRIEF DESCRIPTION OF THE DRAWINGS

In drawings which illustrate embodiments of the invention.

DETAILED DESCRIPTION OF THE PREFERRED EMBODIMENTS

Figure 1:
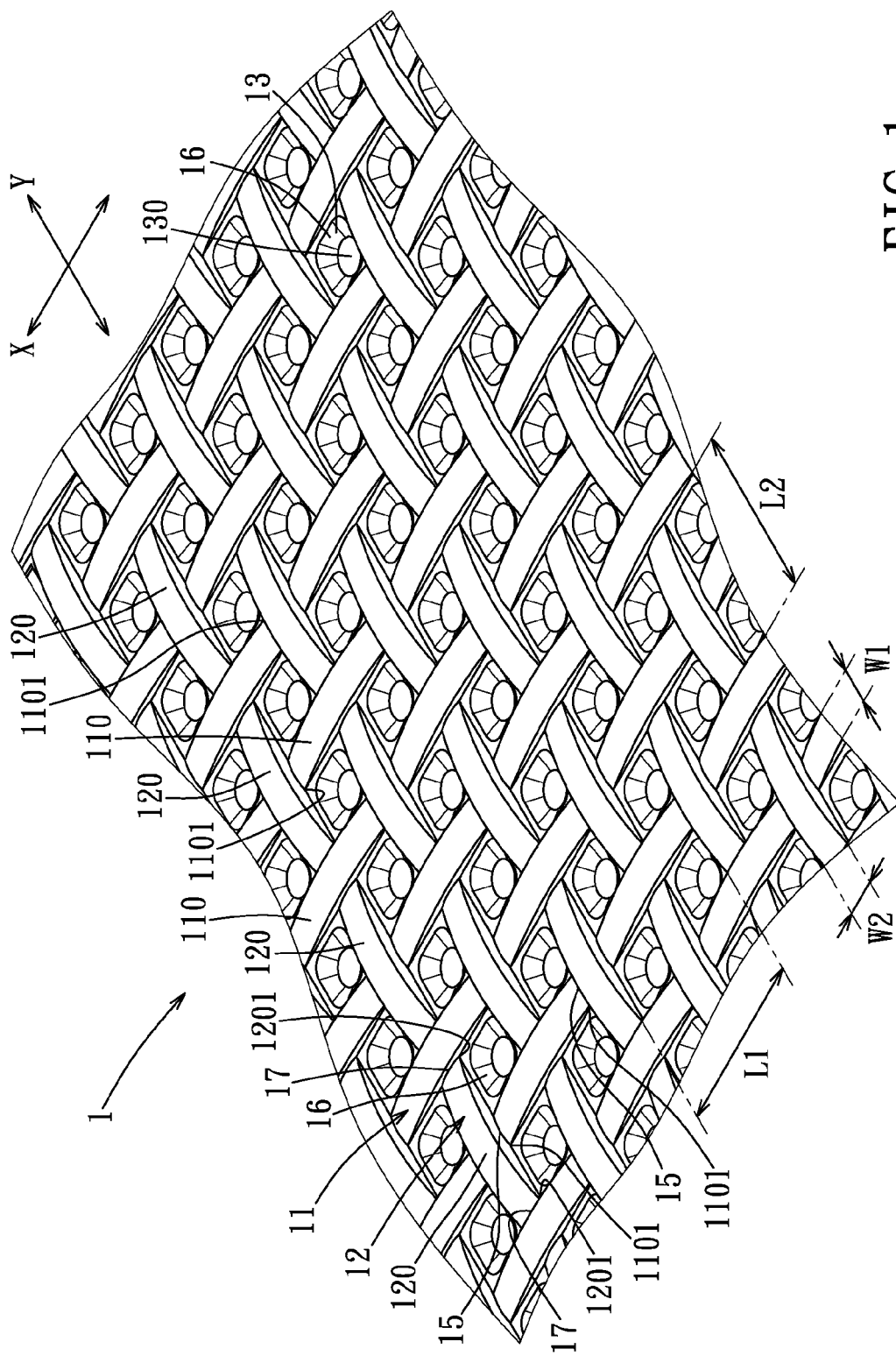
FIG. 1 is a fragmentary perspective view of the first preferred embodiment of a non-woven elastic cloth according to the present invention.
Figure 2:
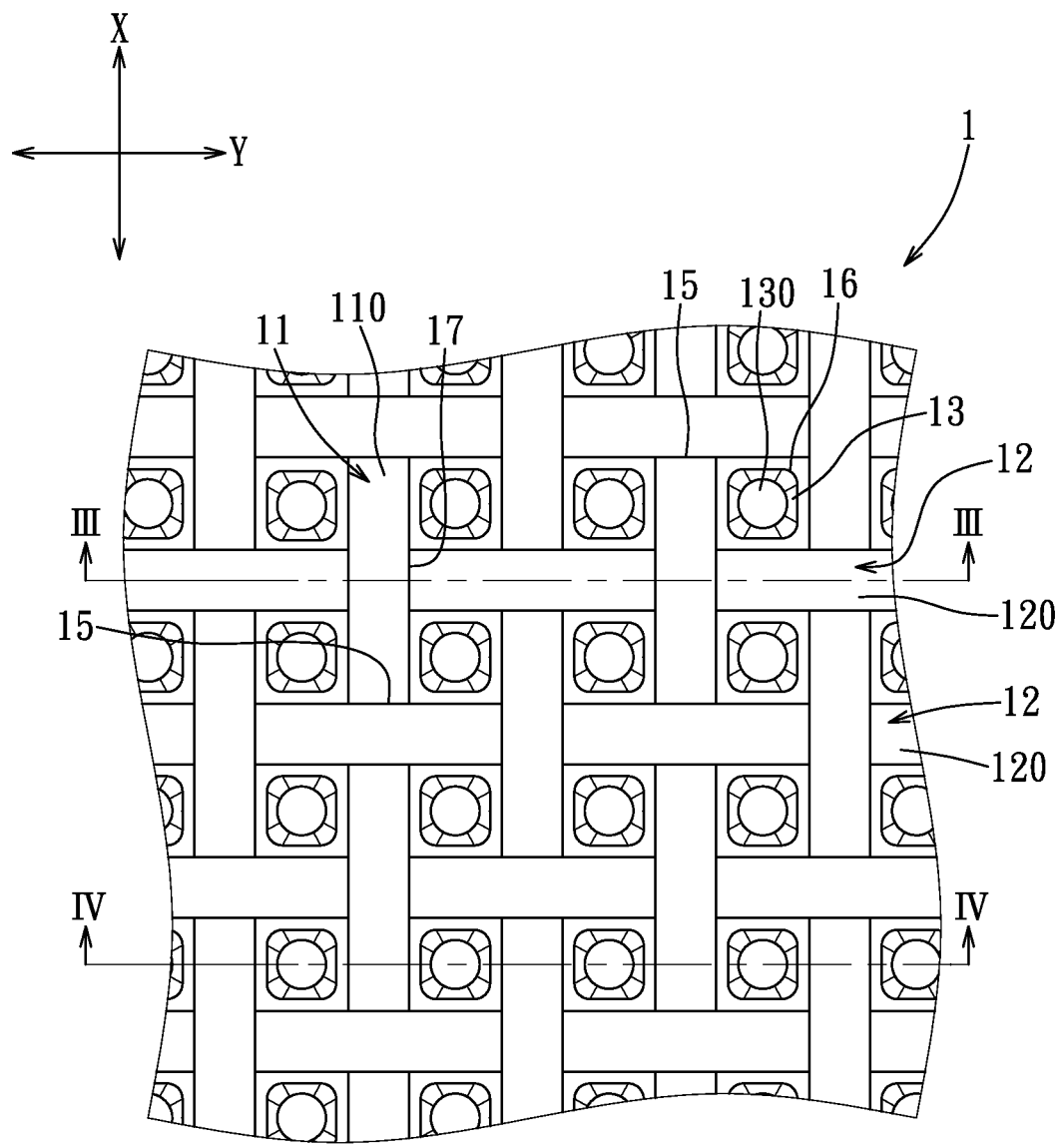
FIG. 2 is a fragmentary schematic top view of the first preferred embodiment.
Figure 3:
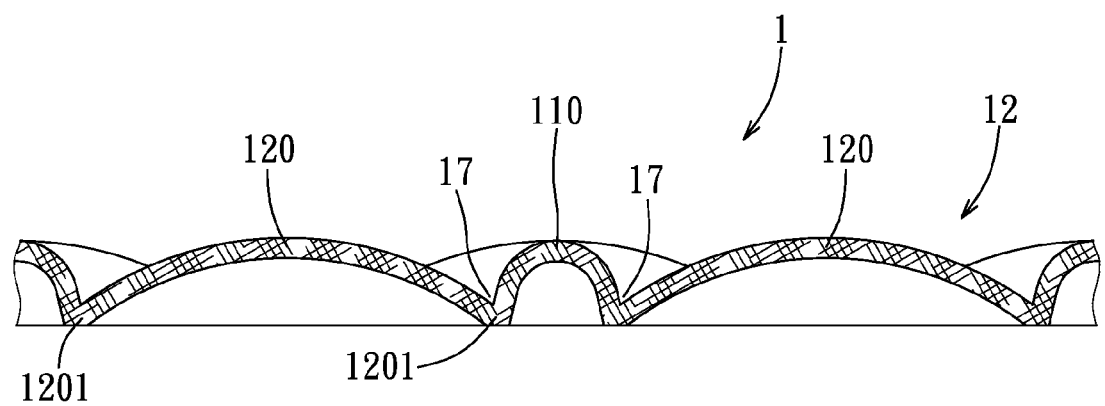
FIG. 3 is a sectional view taken along lines III-III in FIG. 2.
Figure 4:
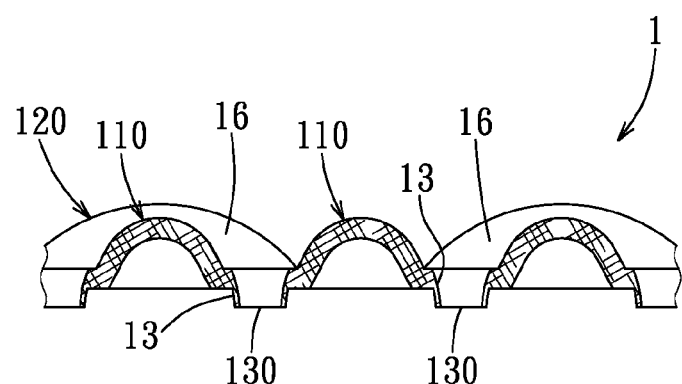
FIG. 4 is a sectional view taken along lines IV-IV in FIG. 2.

Before the present invention is described in greater detail with reference to the accompanying preferred embodiments, it should be noted herein that like elements are denoted by the same reference numerals throughout the disclosure.

FIGS. 1 to 4 illustrate the first preferred embodiment of a non-woven elastic cloth according to the present invention. The non-woven elastic cloth has a woven-like texture that simulates a texture of interlaced warp and weft yarns of a conventional woven cloth, and includes a perforated elastomer film 1.

The perforated elastomer film 1 has a plurality of discrete warp lines 11 extending in a warp direction (X) and adapted to simulate the warp yarns of the conventional woven cloth, a plurality of discrete weft lines 12 extending in a weft direction (Y) and adapted to simulate the weft yarns of the conventional woven cloth, and a plurality of peripheral flanges 13. Each of the discrete warp lines 11 has a plurality of warp segments 110. Each of the discrete weft lines 12 has a plurality of weft segments 120. The warp segments 110 of the warp lines 11 intersect the weft segments 120 of the weft lines 12 so as to form the woven-like texture and to define a plurality of first grid spaces 16 thereamong. Each of the warp segments 110 has two opposite ends 1101 that respectively meet and cooperate with two adjacent ones of the weft segments 120 to form two first V-shaped recesses 15 thereat. Each of the weft segments 120 has two opposite ends 1201 that respectively meet and cooperate with two adjacent ones of the warp segments 110 to form two second V-shaped recesses 17 thereat. Each of the peripheral flanges 13 protrudes outwardly of a respective one of the first grid spaces 16 from corresponding ones of the warp and weft segments 110, 120 that cooperatively define the respective one of the first grid spaces 16, and has an end opening 130 that is disposed outwardly of the respective one of the first grid spaces 16.

In this embodiment, the warp direction (X) is perpendicular to the weft direction (Y). Alternatively, the warp direction (X) and the weft direction (Y) may form an angle other than 90 degrees.

The warp segments 110 have a warp width (w1) in the weft direction (Y). The weft segments 120 have a weft width (w2) in the warp direction (X). The weft width (w2) may be the same as or different from the warp width (w1) so as to impart the perforated elastomer film 1 with different levels of elasticity in the warp and weft directions (X, Y). The warp segments 110 have a warp length (L1) in the warp direction (X). The weft segments 120 have a weft length (W2) in the weft direction (Y). The weft length (L1) may be the same as or different from the warp length (L2) so as to impart the perforated elastomer film 1 with different levels of elasticity in the warp and weft directions (X, Y).

In this embodiment, each of the warp segments 110 and the weft segments 120 has an arcuate cross-section, and each of the peripheral flanges 13 is generally truncated-conical in shape.

Preferably, the perforated elastomer film 1 is made from an elastomer selected from the group consisting of thermoplastic polyurethane and thermoplastic polyolefin. The thermoplastic polyolefin is preferably selected from ethylene-vinyl acetate copolymer and propylene-based elastomer.

Figure 5:
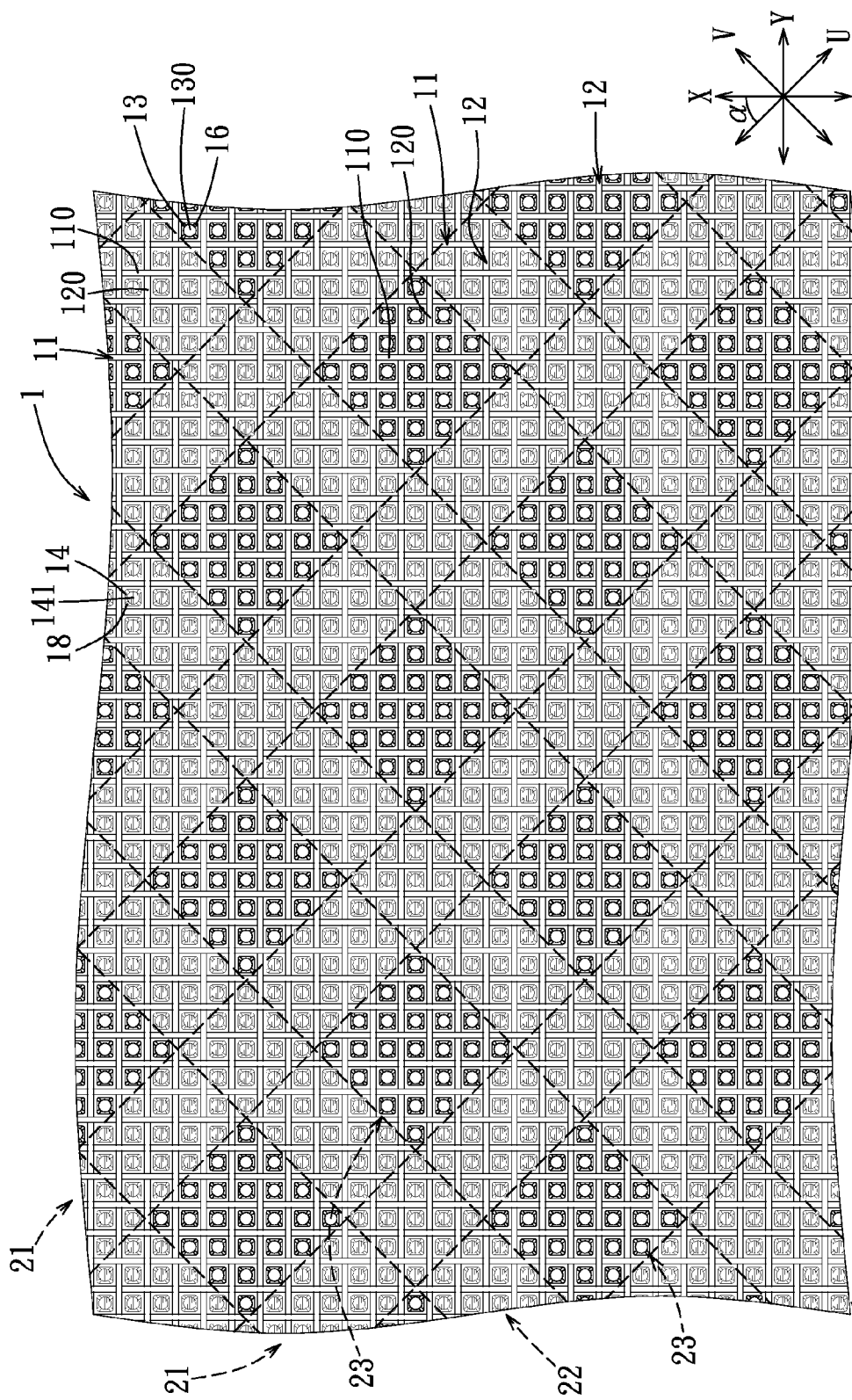
FIG. 5 is a fragmentary schematic top view of the second preferred embodiment of the non-woven elastic cloth according to the present invention.
Figure 6:
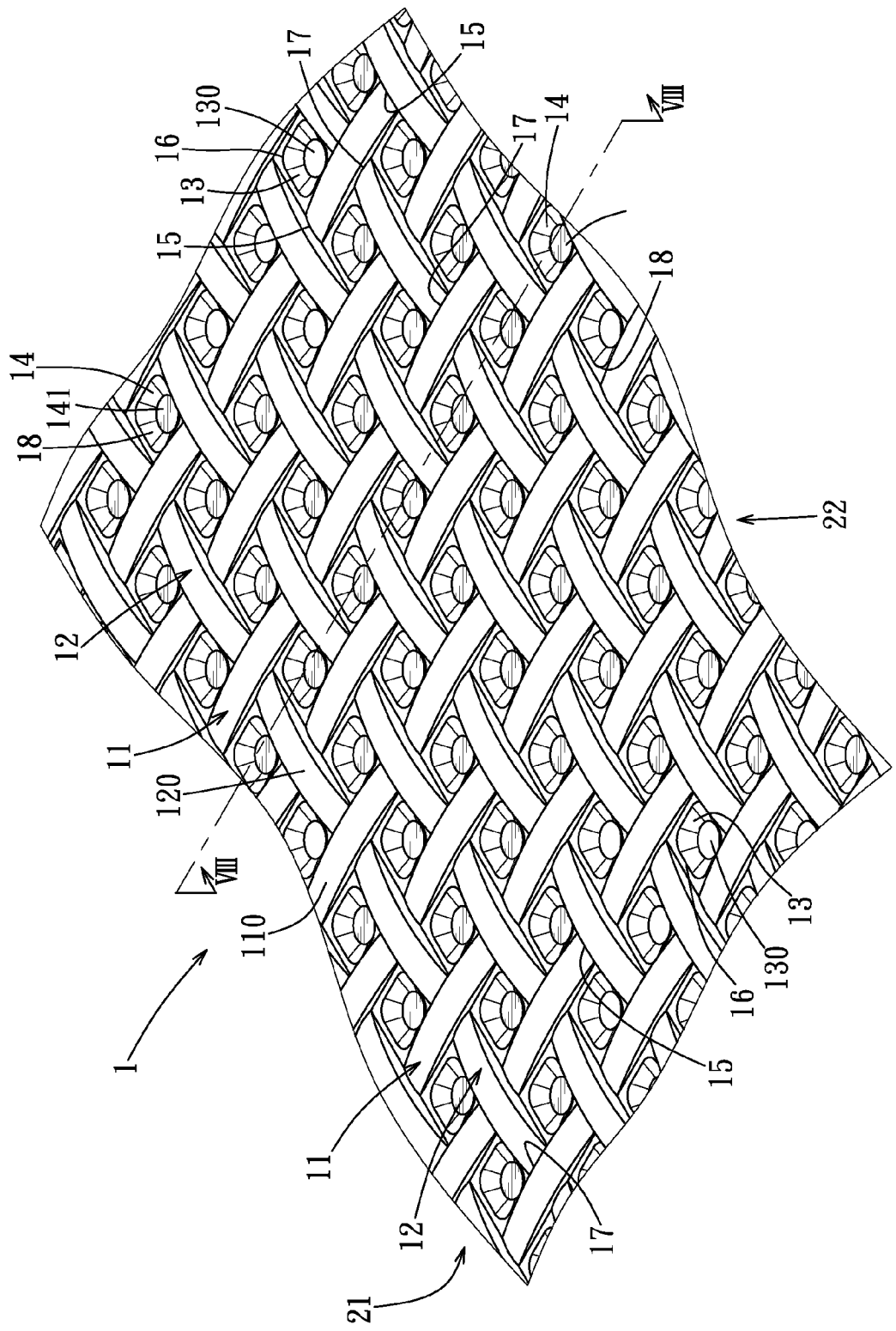
FIG. 6 is a fragmentary perspective view of the second preferred embodiment.
Figure 7:
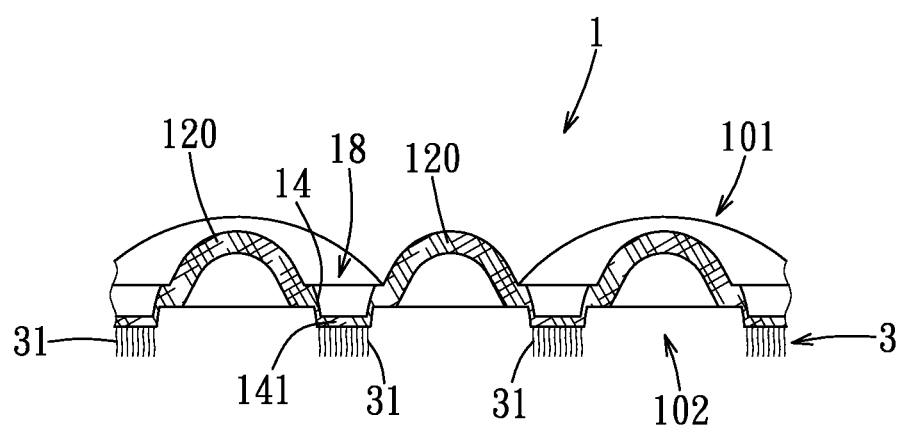
FIG. 7 is a sectional view taken along lines VII-VII in FIG. 6.

FIGS. 5 to 7 illustrate the second preferred embodiment of the non-woven elastic cloth according to the present invention. The second preferred embodiment differs from the previous embodiment in that the second preferred embodiment further includes a fibrous layer 3 (see FIG. 7), that the warp segments 110 of the warp lines 11 cooperate with the weft segments 120 of the weft lines 12 to further define a plurality of second grid spaces 18 which are separated from the first grid spaces 16, and that the perforated elastomer film 1 further has a plurality of protrusions 14, each of which protrudes outwardly of a respective one of the second grid spaces 18 from corresponding ones of the warp and weft segments 110, 120 that cooperatively define the respective one of the second grid spaces 18. Each of the protrusions 14 has a generally U-shaped cross-section and a closed end 141 for closing one side of the respective one of the second grid spaces 18.

In this embodiment, the fibrous layer 3 includes a plurality of fibers 31 thermally bonded to and protruding from the closed ends 14 of the protrusions 14 so as to provide a soft feeling of touch. The perforated elastomer film 1 has opposite first and second sides 101, 102. The woven-like texture is formed at the first side 101, and the fibrous layer 3 is formed at the second side 102.

The second grid spaces 18 are arranged in a pattern of parallel first lanes 21 and parallel second lanes 22 that intersect the first lanes 21 to form a plurality of block regions 23. The first grid spaces 16 are divided into a plurality of groups, each of which is disposed within a respective one of the block regions 23. The first lanes 21 extend in a first lane direction (U). The second lanes 22 extend in a second lane direction (V) perpendicular to the first lane direction (U). The first lane direction (U) and the warp direction (X) form an acute angle (α).

The inclusion of the protrusions 14 in the perforated elastomer film 1 can enhance the tensile strength of the perforated elastomer film 1 and permit the perforated elastomer film 1 to be able to quickly restore to its original shape after being stretched and deformed.

The perforated elastomer film 1 of the previous embodiments can be formed by subjecting a non-perforated elastomer film to vacuum perforating and embossing techniques.

By forming the discrete warp lines 11, the discrete weft lines 12 and the peripheral flanges 13 of the perforated elastomer film 1 of the non-woven elastic cloth of this invention, the aforesaid drawbacks associated with the prior art can be alleviated.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A non-woven elastic cloth having a woven-like texture that simulates a texture of interlaced warp and weft yarns of a conventional woven cloth, said non-woven elastic cloth comprising a perforated elastomer film having a plurality of discrete warp lines extending in a warp direction and adapted to simulate the warp yarns of the conventional woven cloth, a plurality of discrete weft lines extending in a weft direction and adapted to simulate the weft yarns of the conventional woven cloth, and a plurality of peripheral flanges, each of said discrete warp lines having a plurality of warp segments, each of said discrete weft lines having a plurality of weft segments, said warp segments of said warp lines intersecting said weft segments of said weft lines so as to form a woven-like texture and to define a plurality of first grid spaces thereamong, each of said warp segments having two opposite ends that respectively meet and cooperate with two adjacent ones of said weft segments to form two first V-shaped recesses thereat, each of said weft segments having two opposite ends that respectively meet and cooperate with two adjacent ones of said warp segments to form two second V-shaped recesses thereat, each of said peripheral flanges protruding outwardly of a respective one of said first grid spaces from corresponding ones of said warp and weft segments that cooperatively define the respective one of said first grid spaces, and having an end opening that is disposed outwardly of the respective one of said first grid spaces.

2. The non-woven elastic cloth of claim 1, wherein the warp direction is perpendicular to the weft direction.

3. The non-woven elastic cloth of claim 1, wherein said warp segments have a warp width in the weft direction, said weft segments having a weft width in the warp direction, said weft width being different from said warp width.

4. The non-woven elastic cloth of claim 1, wherein said warp segments have a warp length in the warp direction, said weft segments having a weft length in the weft direction, said weft length being different from said warp length.

5. The non-woven elastic cloth of claim 1, wherein said warp segments of said warp lines cooperate with said weft segments of said weft lines to further define a plurality of second grid spaces that are separated from said first grid spaces, said perforated elastomer film further having a plurality of protrusions, each of which protrudes outwardly of a respective one of said second grid spaces from corresponding ones of said warp and weft segments that cooperatively define the respective one of said second grid spaces, each of said protrusions having a generally U-shaped cross-section and a closed end for closing one side of the respective one of said second grid spaces.

6. The non-woven elastic cloth of claim 5, further comprising a fibrous layer that includes a plurality of fibers bonded to said closed ends of said protrusions, said perforated elastomer film having opposite first and second sides, said woven-like texture being formed at said first side, said fibrous layer being formed at said second side.

7. The non-woven elastic cloth of claim 5, wherein said second grid spaces are arranged in a pattern of parallel first lanes and parallel second lanes that intersect said first lanes to form a plurality of block regions, said first grid spaces being divided into a plurality of groups, each of which is disposed within a respective one of said block regions.

8. The non-woven elastic cloth of claim 5, wherein said first lanes extend in a first lane direction, said second lanes extending in a second lane direction perpendicular to the first lane direction, the first lane direction and the warp direction forming an acute angle.

9. The non-woven elastic cloth of claim 1, wherein each of said peripheral flanges is generally truncated-conical in shape.

10. The non-woven elastic cloth of claim 1, wherein said perforated elastomer film is made from an elastomer selected from the group consisting of thermoplastic polyurethane and thermoplastic polyolefin.

11. The non-woven elastic cloth of claim 10, wherein said thermoplastic polyolefin is selected from one of ethylene-vinyl acetate copolymer and propylene-based elastomer.

12. The non-woven elastic cloth of claim 1, wherein each of said warp segments and said weft segments has an arcuate cross-section.

\* \* \* \* \*